(12) United States Patent
Lv et al.

(10) Patent No.: US 9,590,922 B2
(45) Date of Patent: Mar. 7, 2017

(54) PROGRAMMABLE AND HIGH PERFORMANCE SWITCH FOR DATA CENTER NETWORKS

(75) Inventors: Guohan Lv, Sichuan (CN); Chuanxiong Guo, Nanjing (CN); Yongqiang Xiong, Beijing (CN); Haitao Wu, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 13/106,226

(22) Filed: May 12, 2011

(65) Prior Publication Data

US 2012/0287782 A1   Nov. 15, 2012

(51) Int. Cl.
*H04L 12/24*      (2006.01)
*H04L 12/931*     (2013.01)
*H04L 12/743*     (2013.01)

(52) U.S. Cl.
CPC ........ *H04L 49/356* (2013.01); *H04L 45/7457* (2013.01); *H04L 49/506* (2013.01)

(58) Field of Classification Search
CPC .. H04L 49/356; H04L 49/506; H04L 45/7457
USPC ....................... 370/352, 392, 395.3; 365/48.1
See application file for complete search history.

(56) References Cited

U.S. PATENT DOCUMENTS

| 5,999,525 | A  | * | 12/1999 | Krishnaswamy ... H04L 12/1818 |
|           |    |   |         | 370/352 |
| 6,633,567 | B1 | * | 10/2003 | Brown ....................... 370/395.3 |
| 7,421,575 | B2 |   | 9/2008  | Ang et al. |
| 7,571,278 | B2 |   | 8/2009  | Anthony, Jr. et al. |
| 7,830,691 | B2 | * | 11/2010 | Srinivasan et al. .......... 365/49.1 |
| 2006/0047821 | A1 | * | 3/2006 | Kim .............................. 709/227 |
| 2007/0094691 | A1 | * | 4/2007 | Gazdzinski ...................... 725/62 |
| 2008/0091868 | A1 | * | 4/2008 | Mizrachi et al. ............. 710/263 |
| 2008/0225853 | A1 | * | 9/2008 | Melman et al. .............. 370/392 |
| 2010/0122107 | A1 |   | 5/2010 | Arimilli et al. |
| 2010/0157020 | A1 | * | 6/2010 | Choi ...................... H04N 5/232 |
|              |    |   |        | 348/47 |
| 2010/0180048 | A1 |   | 7/2010 | Guo et al. |
| 2010/0199275 | A1 |   | 8/2010 | Mudigonda et al. |
| 2011/0249970 | A1 | * | 10/2011 | Eddleston et al. .............. 398/58 |
| 2013/0107872 | A1 | * | 5/2013 | Lovett et al. ................. 370/352 |

OTHER PUBLICATIONS

76 Gbps Integrated Multilayer Ethernet Switch, (c) 2010 Broadcom Corporation, retrieved at <<http://www.broadcom.com/collateral/pb/56330-PB01-R.pdf>> 2 pages.

(Continued)

*Primary Examiner* — Joseph Bednash
(74) *Attorney, Agent, or Firm* — Liwen Shi; Sandy Swain; Micky Minhas

(57) ABSTRACT

This application describes routing packets from a source server to a plurality of ports of a switch. The switch is programmed by the control server and is used to direct incoming data packets to one or more ports of the switch in a manner that reduces congestion of incoming data packets to a destination server. Further, the control server queries congestion information from the switch, and then sends congestion notification back to the source server to either increase or decrease the amount of data being sent to the destination server.

20 Claims, 4 Drawing Sheets

(56) References Cited

OTHER PUBLICATIONS

Abu-Libdeh et al., "Symbiotic Routing in Future Data Centers," SIGCOMM '10, Aug. 30-Sep. 3, 2010, New Delhi, India, (c) 2010, retrieved at <<http://research.microsoft.com/en-us/um/people/antr/Publications/sigcomm10-camcube.pdf>>, 12 pages.
Al-Fares et al., "A Scalable, Commodity Data Center Network Architecture," SIGCOMM '08, Aug. 17-22, 2008, Seattle, Washington, USA, (c) 2008, <<http://ccr.sigcomm.org/online/files/p63-alfares.pdf>>, 12 pages.
Al-Fares et al., "Hedera: Dynamic Flow Scheduling for Data Center Networks," In Proceedings of the 7th USENIX conference on Networked systems design and implementation , (c) 2010, received at <<http://cseweb.ucsd.edu/~malfares/Hedera_NSDI10_camera_ready.pdf>>, 15 pages.
Alizadeh et al., "Data Center Transport Mechanisms: Congestion Control Theory and IEEE Standardization," Forty-Sixth Annual Allerton Conference Allerton House, UIUC, Illinois, USA, Sep. 23-26, 2008, retrieved at <<http://ieeexplore.ieee.org/stamp/stamp.jsp?arnumber=04797706>>, pp. 1270-1277.
Calderon et al., "Active Network Support for Multicast Applications," (c) 1998 IEEE, retrieved at <<http://e-archivo.uc3m.es/bitstream/10016/2918/1/active-network-1998.pdf>>, pp. 46-52.
Cascado et al., "Ripcord: A Modular Platform for Data Center Networking," Jun. 7, 2010, retrieved at <<http://www.eecs.berkeley.edu/Pubs/TechRpts/2010/EECS-2010-93.pdf>>, 15 pages.
Covington et al., "A Packet Generator on the NetFPGA Platform," 17th IEEE Symposium on Field Programmable Custom Computing Machines, Apr. 5-7, 2009, retrieved at <<http://netfpga.org/documents/fccm-packet_generator-09-7.pdf>>, 4 pages.
Dobrescu et al., "RouteBricks: Exploiting Parallelism to Scale Software Routers," Proceedings of the ACM SIGOPS 22nd Symposium on Operating Systems Principles, ACM New York, NY, USA (c) 2009, retrieved at <<http://www.sigops.org/sosp/sosp09/papers/dobrescu-sosp09.pdf>>, pp. 1-17.
FM3000 Policy Engine, Embedded High-bandwidth Packet Processing, Fulcrum, Microsystems, White Paper, Jun. 2008, retrieved at <<http://www.fulcrummicro.com/documents/applications/FM3000_Policy_Engine.pdf>>, pp. 1-9.
Greenberg et al., "VI2: A Scalable and Flexible Data Center Network," SIGCOMM '09, Aug. 17-21, 2009, Barcelona, Spain, (c) 2009, retrieved at <<http://ccr.sigcomm.org/online/files/p51.pdf>>, pp. 51-62.
Greenhalgh et al., "Flow Processing and the Rise of Commodity Network Hardware," ACM SIGCOMM Computer Communication Review, vol. 39, No. 2, Apr. 2009, retrieved at <<http://www.comp.lancs.ac.uk/~papadimp/ccr09.pdf>>, pp. 21-26.
Grid/Utility Computing, Cisco Systems Brochure, retrieved on Jan. 25, 2011 at <<http://www.cisco.com/en/US/prod/collateral/ps6418/ps6419/ps6421/prod_brochure0900aecd802a0d8a.pdf>>, 4 pages.
Guo et al., "BCube: A High Performance, Server-centric Network Architecture for Modular Data Centers," SIGCOMM '09, Aug. 17-21, 2009, Barcelona, Spain, (c) 2009, retrieved at <<http://research.microsoft.com/pubs/81063/comm136-guo.pdf>>, 12 pages.
Guo et al., "DCell: A Scalable and Fault-Tolerant Network Structure for Data Centers," SIGCOMM '08, Aug. 17-22, 2008, Seattle, Washington, USA (c) 2008, retrieved at <<http://research.microsoft.com/pubs/75988/dcell.pdf>>, 12 pages.

Guo "Modular Data Center Network Design and Implementation," Regents of the University of Minnesota, Oct. 25, 2010, retrieved at <<http://www.cs.umn.edu/research/colloquia.php?id=972>>, 1 page.
Guo et al., "SecondNet: A Data Center Network Virtualization Architecture with Bandwidth Guarantees," ACM CoNEXT 2010, Nov. 30-Dec. 3, 2010, Philadelphia, USA, retrieved at <<http://conferences.sigcomm.org/co-next/2010/CoNEXT_papers/15-Guo.pdf>>, 12 pages.
Han et al., "PacketShader: a GPU-Accelerated Software Router," SIGCOMM '10, Aug. 30-Sep. 3, 2010, New Delhi, India, (c) 2010, retrieved at <<http://www.ndsl.kaist.edu/~kyoungsoo/papers/packetshader.pdf>>, 12 pages.
Kohler et al., "The Click Modular Router," (c) 2000, retrieved at <<http://pdos.csail.mit.edu/papers/click:tocs00/paper.pdf>>, 34 pages.
Lehman et al., "Active Reliable Multicast," Proc. IEEE INFOCOM '98, Mar. 29-Apr. 2, 1998, retrieved at <<http://www.sds.lcs.mit.edu/publications/postscript/infocom98_arm.ps>>, pp. 1-9.
McKeown et al., "OpenFlow: Enabling Innovation in Campus Networks," ACM SIGCOMM Computer Communication Review, vol. 38, Issue 2, Apr. 2008, retrieved at <<http://www.openflowswitch.org/documents/openflow-wp-latest.pdf>>, 6 pages.
Miller et al., "Motivating Future Interconnects: A Differential Measurement Analysis of PCI Latency," ANCS '09 Oct. 19-20, 2009, Princeton, New Jersey, USA, (c) 2009, retrieved at <<http://www.cl.cam.ac.uk/~awm22/publications/miller2009motivating.pdf>>, 10 pages.
Mogul et al., "API Design Challenges for Open Router Platforms on Proprietary Hardware," In Proceedings of the ACM Workshop on Hot Topics in Networks (HotNets), Calgary, Alberta, Canada, Oct. 2008, retrieved at <<http://conferences.sigcomm.org/hotnets/2008/papers/hotnets08finalmogul.pdf>>, 6 pages.
Mysore et al., "PortLand: A Scalable Fault-Tolerant Layer 2 Data Center Network Fabric," SIGCOMM '09, Aug. 17-21, 2009, Barcelona, Spain, (c) 2009, retrieved at <<http://cseweb.ucsd.edu/~vahdat/papers/portland-sigcomm09.pdf>>, 12 pages.
Naous et al., "NetFPGA: Reusable Router Architecture for Experimental Research," PRESTO '08, Aug. 22, 2008, Seattle, Washington, USA, (c) 2008, retrieved at <<http://conferences.sigcomm.org/sigcomm/2008/workshops/presto/papers/p1.pdf>>, pp. 1-7.
OpenFlow Switch Specification, Version 1.0.0 (Wire Protocol (0x01), Dec. 31, 2009, retrieved at <<http://www.openflowswitch.org/documents/openflow-spec-v1.0.0.pdf>>, pp. 1-42.
Pan, QCN Pseudo Code, Version 2.3, 2009, retrieved at <<http://www.ieee802.org/1/files/public/docs2009/au-rong-qcn-serial-hai-v23.pdf.>>, 9 pages.
Shah et al., "Fast Updating Algorithms for TCAMs," (c) 2001 IEEE, retrieved at <<http://140.116.82.38/members/html/phd/jengjian/pdf/Fast%20updating%20algorithms%20for%20TCAMs.pdf>>, pp. 36-47.
Shieh et al., "SideCar: Building Programmable Datacenter Networks without Programmable Switches," Hotnets '10, Oct. 20-21, 2010, Monterey, CA, USA, (c) 2010, retrieved at <<http://www.cs.cornell.edu/~ashieh/sidecar-hotnets.pdf>>, 6 pages.
SUA Community for Interix, SUA & SFU, (c) 2008, 2009 Interip Systems, Inc., retrieved on Jan. 27, 2011 at <<http://www.suacommunity.com/SUA.aspx.>>, 3 pages.
Topspin Rakes It In, Enterprise Storage Forum, retrieved on Jan. 25, 2011, at <<http://www.enterprisestorageforum.com/industrynews/article.php/3106491/Topspin-Rakes-It-In.htm>>, 3 pages.

\* cited by examiner

PROGRAMMABLE AND HIGH PERFORMANCE SWITCH FOR DATA CENTER NETWORKS

BACKGROUND

Due to the rise of cloud computing, the demand for larger data center networks (DCN) has increased to allow users to store access information from virtually any location. A DCN may include hundreds of thousands of servers connected to each other, which makes routing of information into and out of the DCN a very complex task. Pure software based systems, Field Programmable Gate Array (FPGA) platforms (e.g., NetFPGA), and OpenFlow switches are often used to manage data packet routing and congestion control within the DCN. However, software based routing systems require high processor overhead and can include processing latency issues while waiting for processing time on the CPU. For example, using CPU intensive software-based systems with high latency issues may prevent efficient implementation of control plane functions such as signaling and congestion control. FPGA platforms are difficult to program and are expensive to implement. OpenFlow is limited to operating on a limited type of protocols (e.g., Transmission Control Protocol/Internet Protocol (TCP/IP) packets) and would be susceptible to compatibility issues.

SUMMARY

A programmable switch that may be coupled to a server to facilitate control plane functions and congestion control is described herein. The switch described herein is capable of operating as a programmable packet forwarding engine that supports flow/congestion control of information passed through a data center network (DCN). The workload of routing incoming data packets may be transferred from the processor/memory of a destination server to a programmable device as described below.

The switch incorporates a hardware architecture that may be implemented into a printed circuit board, which may be integrated into any existing server. In some aspects, the switch may include programmable chip sets, which are programmed via the server and route incoming data to a desired output port. The switch may include a switching chip that can perform packet matching based on flexible packet fields and achieve full line rate forwarding even for small packet sizes. The switch may implement any type of forwarding scheme (e.g., Destination Address, Source Routing, Tag, etc.) for data packets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes, in part, apparatuses, systems, and techniques for routing data packets to various ports of a routing device to reduce congestion or optimize data packet transfer based on desired preferences of a control server's administrator. For example, the device extracts keys from the incoming data packets that are matched to an entry in a ternary content-addressable memory (TCAM) table that directs the data packet to a designated device port. The keys include an index value and a plurality of intermediate address values that are extracted simultaneously or nearly simultaneously from the data packet. Further, the index values and the intermediate addresses are compared to the entries in the TCAM table at or near a same time. When a match occurs, the device assigns the data packet to an output port that is associated with the matched TCAM entry.

The apparatuses, systems, and techniques described herein may be implemented in a number of ways. Example implementations are provided below with reference to the following figures.

Example Environment

Figure 1:
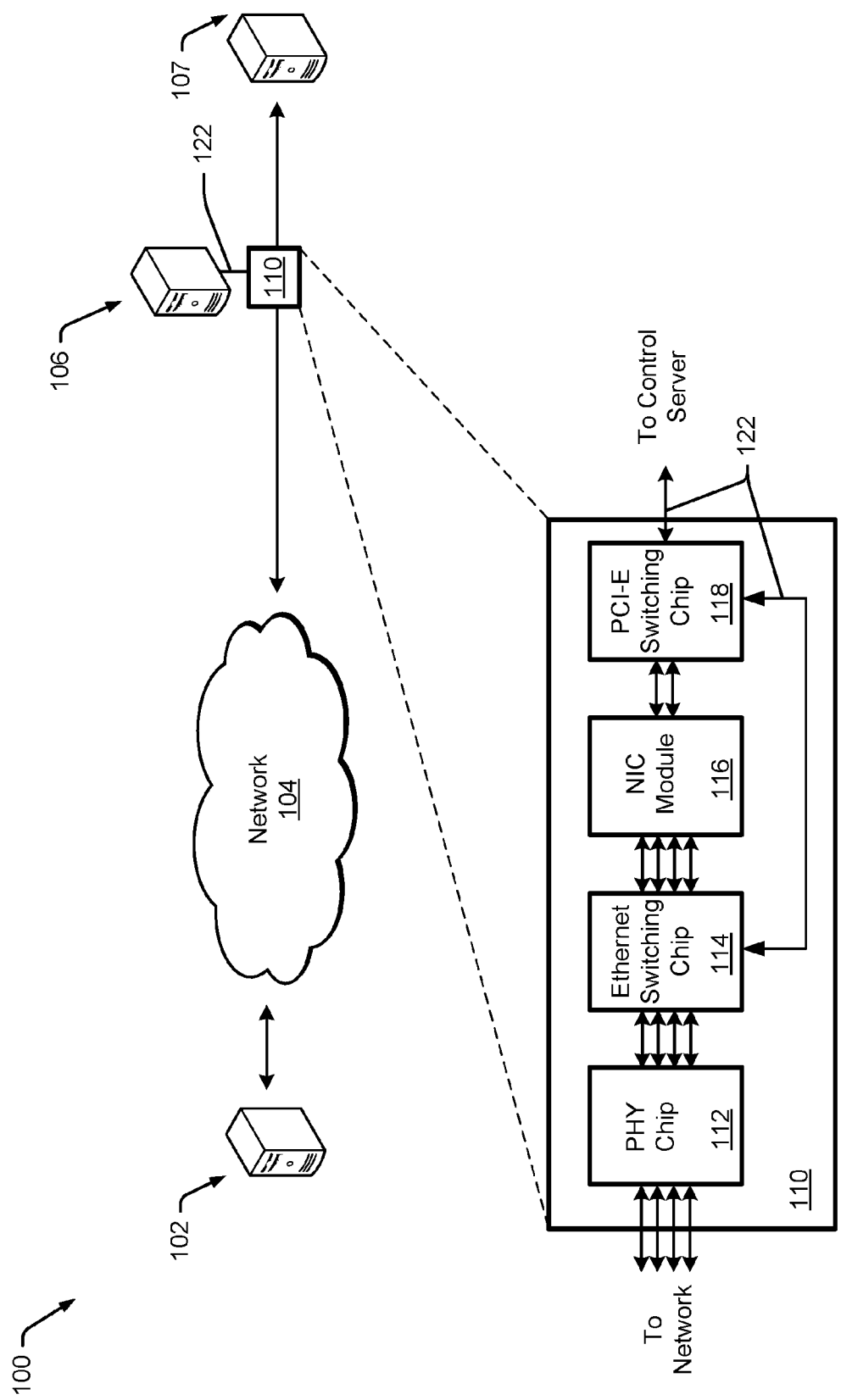
FIG. 1 is a schematic diagram of an illustrative environment that includes a control server, a source server, and switching device configured to route data packets.

FIG. 1 illustrates an example environment 100 that may be used to implement the described techniques. The example environment 100 may include a source server 102, a network (e.g., the internet) 104, a destination server 107, a control server 106, and a routing device 110 disposed between the source server 102 and the destination server 107. In accordance with various embodiments, the source server 102 exchanges data packets with the destination server 107.

The network 104 comprises a global system of interconnected computer networks that serve content to devices, such as the destination server 107. The network 104 may include a number of different content providers that provide varying types of content to these devices. On the network 104 (or on any other network), information is exchanged between servers to facilitate transactions or exchanges of information or any type of content that may be displayed or stored by a user. The amount of information being transferred may exceed the capacity of the network or servers. As such, devices or techniques may be implemented to facilitate the efficient transfer of the information between the source server 102 and the destination server 107.

In some embodiments, the routing device 110 may manage the routing of the information between the source server 102 and the destination server 107. By way of example and not limitation, the routing device 110 may be installed inside the control server 106 and configured to route information received from the source server 102 to an output port to the destination server 107. In various embodiments, a plurality of source servers or other servers may also be sending data packets to the routing device 110 at or near a same time. However, for the purpose of ease of explanation, only a single source server 102 and a single destination server 107 are illustrated as being in communication with the routing device 110.

By way of example and not limitation, the routing device 110 may include an Ethernet physical transceiver chip (PHY) chip 112, an Ethernet switching chip 114, a Network Interface Controller (NIC) module 116, and a peripheral component interconnect express (PCI-E) switching chip 118. The PHY chip 112 may receive a plurality of data packets over a plurality of channels from the source server 102. The PHY chip 112 may be responsible for send/receive functions of Ethernet frames or data packets over the network 104. The Ethernet switching chip 114 performs as a fully programmable forwarding engine that can perform packet matching using a TCAM table to route incoming packets to specific output ports of the routing device. The Ethernet switching chip 114 can also route incoming packets to the control server 106. Prior to reaching the control server 106 from the Ethernet switching card 114, the incoming data packets are routed through the NIC module 116 and the PCI-E chip 118. In the FIG. 1, a single network interface chip is illustrated via the NIC module 116, however, the module 116 may include two or more network interface chips to handle larger quantities of incoming data. The PCI-E chip 118 receives the incoming packets from the NIC module 116 and directs them to the control server 106 via channel 122.

Example Process to Implement Routing of Data Packets

Figure 2:
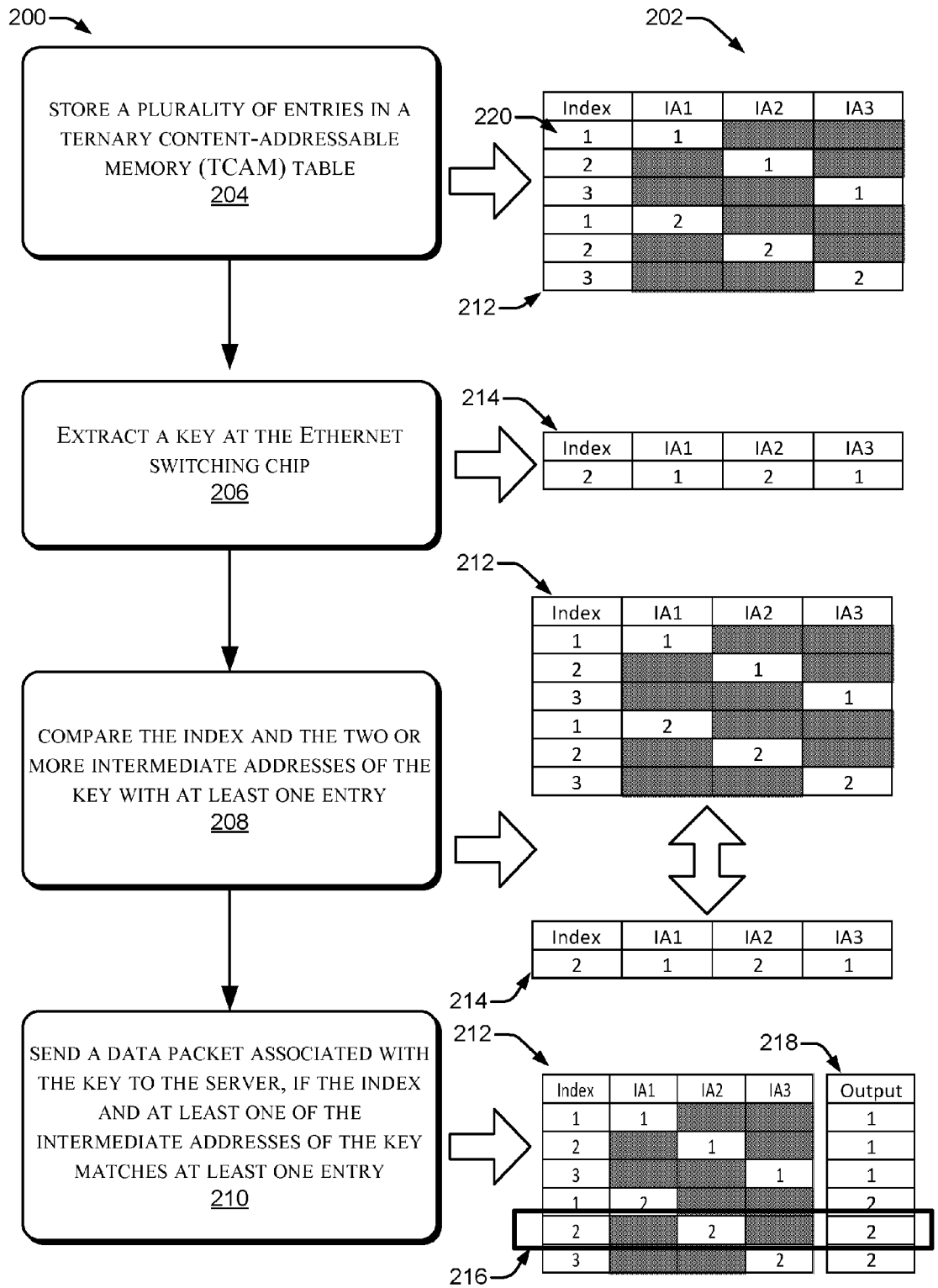
FIG. 2 is a pictorial flow diagram that shows an illustrative process to route incoming data packets to desired ports of the routing device.

FIG. 2 illustrates an example process 200 that the Ethernet switching chip 114 of FIG. 1 may implement to route incoming data packets to preferred ports of itself. Additionally, FIG. 2 illustrates representative figures 202, located adjacent to blocks that describe functionality of the process 200.

At block 204, the control server 106 programs the TCAM table stored in the Ethernet switching chip 114. By way of example and not limitation, a TCAM table 212 illustrates one possible format of the TCAM table. In one instance, the TCAM table 212 includes a plurality of index values (e.g., 1, 2, 3 . . . ) that may be repeated throughout the table. Each index value 220 may be associated with a plurality of intermediate addresses (e.g., IA1, IA2, and IA3). Also, the control server 106 may select portions of the TCAM table 212 to be masked from consideration during the routing process. This masking feature is illustrated by the grayed sections of the intermediate addresses and is designated as "don't care" entries of the TCAM table 212. On the other hand, the entries that include values may be designated as "care" entries that are actively used in the routing process.

At block 206, a key 214 is extracted from the incoming packet received at the Ethernet switching chip 114. The key 214 comprises an index value and a plurality of intermediate addresses associated with the index value. By way of example and not limitation, a key 214 may include one index value and multiple intermediate address values (e.g., three intermediate address values, etc.).

At block 208, the Ethernet switching chip 114 simultaneously or nearly simultaneously compares the key 214 (i.e., the extracted index values and intermediate address values) with each of the entries in the TCAM table 212. In this instance, the index value and the intermediate addresses of the key 214 are compared against the index values and associated intermediate addresses of TCAM table 212, such that each comparison is attempting to match the index value and intermediate addresses of the key to an entry in the TCAM table at the same time. In other words, the index values and the intermediate address values of the key 214 and at least one entry on the TCAM table 212 are compared together to determine if they match. In some embodiments, the "don't care" entries in the TCAM table are excluded from this comparison. Accordingly, the comparison against the TCAM table 212 may only include "care" entries. For example, in line 1 of TCAM table 212, only the index value and IA1 are used for comparison purposes. IA2 and IA3 of line 1 are not included in the comparison process, both IA2 and IA3 are shown as "don't care" entries as represented by the masking of their values in TCAM table 212. Similarly, for line 2 of TCAM table 212, the IA1 and IA3 entries are masked and are designated as "don't care" entries. The intermediate address entries in TCAM table 212 that have values shown (i.e., 1, 2 . . . ) are designated as "care" entries.

At block 210, if the extracted key 214 matches a TCAM entry (e.g., entry 216), then the data packet associated with the key 214 is sent to a designated port of the switching chip. However, in other instances, if portions of the TCAM table 212 are masked as described above, then only the unmasked or "care" portions of the TCAM table are used in the matching process. For example, key 214 matches an entry 216 in TCAM table 212, the index values of "2" are matched as well as the values in the intermediate address 2 positions (i.e., "2" and "2"). Additionally, an output table 218 is associated with the TCAM table 212 such that each entry has an output of the switching chip. In this instance, the entry 216 is associated with port 2 of the switching chip. Accordingly, the data packet associated with the key 214 will be sent to port 2 of the switching chip.

Example Process to Control Congestion of Data Packets

Figure 3:
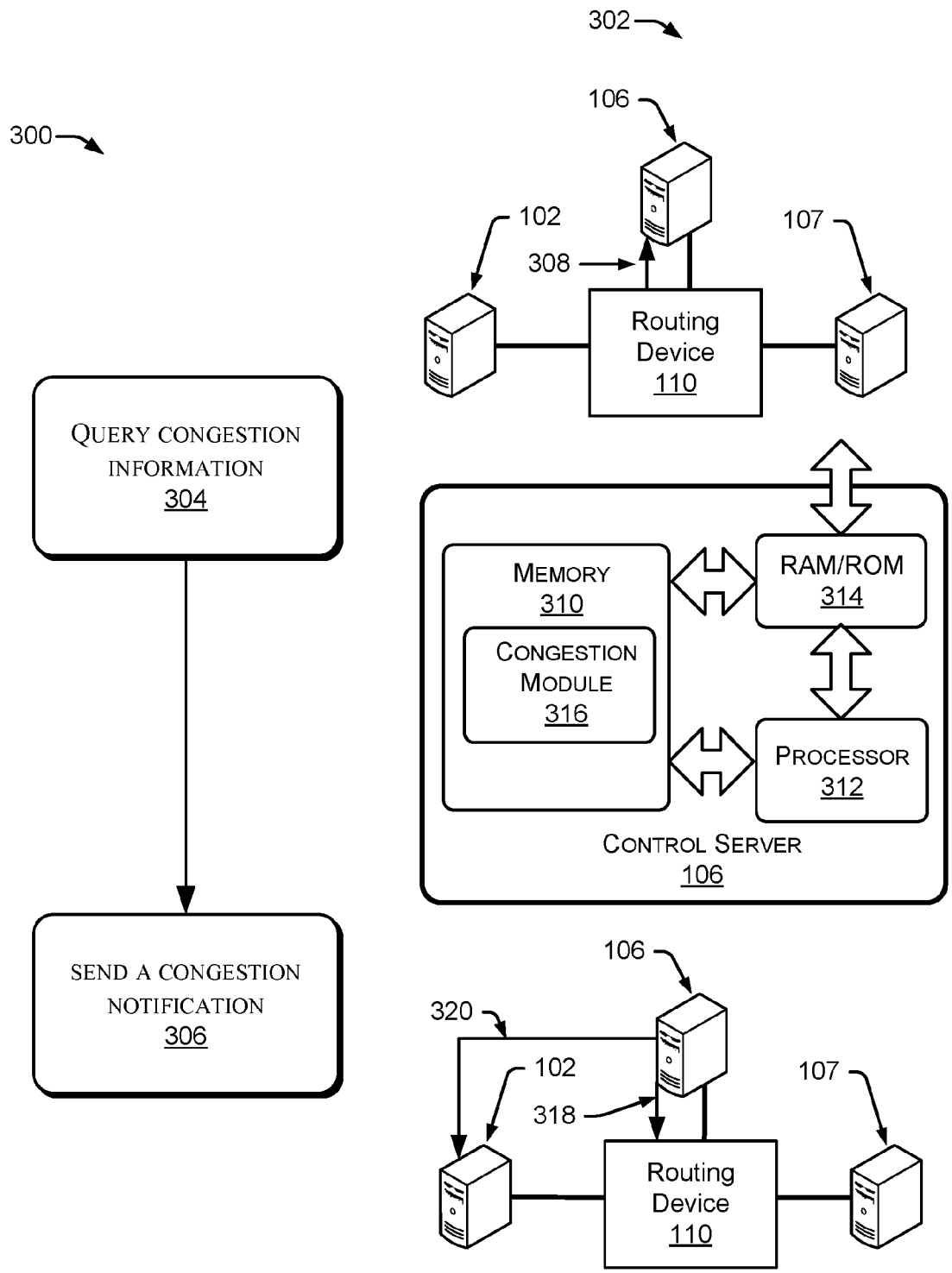
FIG. 3 is a pictorial flow diagram that shows an illustrative process to provide information to the control server for generating a congestion notice that is sent to the source server.

FIG. 3 illustrates an example process 300 that the control server 106 of FIG. 1 may implement to control the congestion of incoming data packets using the routing device 110. Additionally, FIG. 3 illustrates representative figures 302, located adjacent to blocks that describe functionality of the process 300.

At block 304, the control server 106 queries congestion information 308 from routing device 110. The congestion information 308 may include the number of data packets waiting to be routed by the routing device 110 and the available bandwidth from the routing device 110 to the destination server 107.

Turning to the control server 106, the server may include a memory 310, a processor component 312, and a RAM/ROM component 314. A congestion point module 316 may be stored in the memory 310. The RAM/ROM component 314 and the memory 310 of the control server 106 may be comprised of any computer-readable media. The computer-readable media includes, at least, two types of computer-readable media namely computer storage media and communications media. Computer readable media includes volatile and non-volatile, removable and non-removable media implemented in any method or technology for storage information such as computer readable instructions, data structures, program modules, program components, or other data. Computer storage media includes, but is not limited to, RAM, ROM, EEPROM, flash memory, or other memory technology, CD-ROM, digital versatile disks (DVD), other optical storage technology, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as carrier waves, or other transmission mechanisms. As defined herein, computer storage media does not include communication media. One of ordinary skill in the art would contemplate the techniques for executing the computer-readable instructions via the processor 312 in order to implement the techniques described herein.

At block 306, the control server 106 sends a congestion notification 318 to the source server 102. In this instance, the congestion notification 318 is shown to be sent to the source server 102 via the routing device 110. However, in another embodiment, a congestion notification 320 may be sent directly from the control server 106 without going through the routing device 110. Accordingly, upon receipt of the congestion notification 318 or 320, the source server 102 may reduce the rate of data packets being sent to the destination sever 107, or the server 102 may increase the rate of data packets being sent to a destination server 107.

Exemplary Architecture

Figure 4:
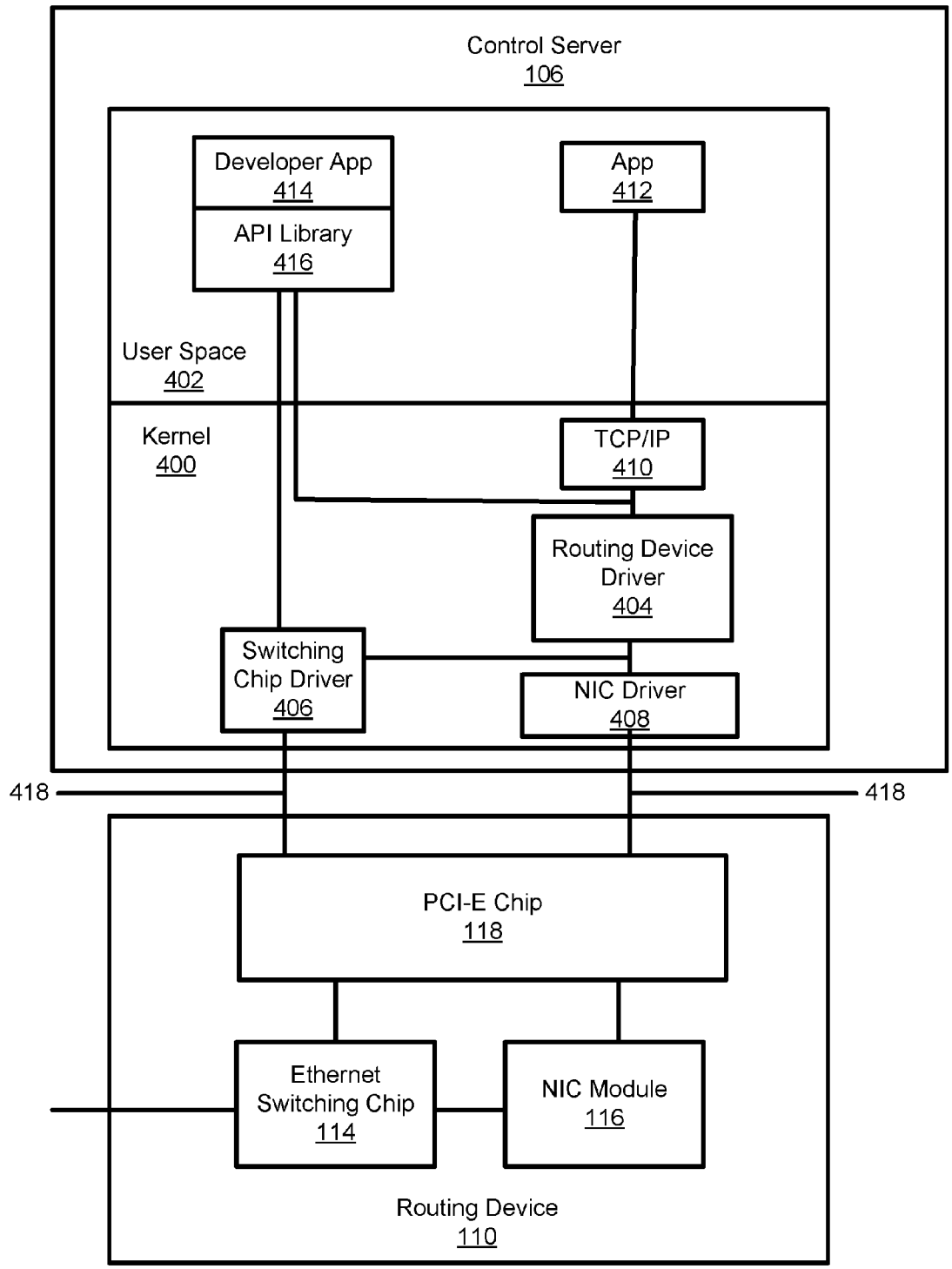
FIG. 4 is a schematic diagram of a routing device and a control server that illustrates the architecture for routing incoming data packets to an outgoing port.

FIG. 4 illustrates the architecture of the routing device 110 and the control server 106 to implement the routing of incoming data packets to the destination server 107. At a high level, the incoming data from the network 104 proceeds to the Ethernet switching chip 114 that designates the output port of the incoming data. The control server 106 manages the Ethernet switching chip 114 and the NIC module 116 via a software kernel 400 and a user space 402. In conjunction with each other, the software kernel 400 and the user space 402 manage the routing device 110.

The kernel 400 may include a routing device driver 404 that controls the Ethernet switching chip 114 by sending and receiving control messages via a switching chip driver 406 via a communications channel 418. In this way, the TCAM table 212 may be programmed to include a plurality of index values and associated intermediate addresses. Further, specific entries in the TCAM table may be masked out as described in the description of FIG. 2. The routing device driver 404 also manages congestion control and in-network packet processing by controlling and monitoring the NIC module 116 via a NIC driver 408 over a communications channel 120. The kernel 400 may also include a TCP/IP component 410 that passes the incoming date from the routing device 110 onto other applications 412 in the user space 402 using TCP/IP protocol.

In one implementation, the routing device driver 404 acts a central hub to receive all incoming traffic from the routing device 110. The routing device driver 404 can process the data itself or it can provide the data to the user space 402 and let the applications 412 process the data. Processing the data in the driver 404 may provide higher performance with respect to latency concerns but is difficult to program and debug. Meanwhile, processing the data in the user space 402 is easier from a development aspect but sacrifices some performance. Using the routing device architecture, a user can decide whether to use the user space 402 or the routing device 110. For example, for low rate data traffic the routing device driver 404 can deliver the data to the user space 402 for processing. In contrast, for data traffic with low latency requirements and high speed in-network processing may be processed at the routing device driver 404 more efficiently than in the user space 402.

Also, the user space may include a developer application 414 along with an application programming interface (API) library 416 that a developer may use to program or control the routing device driver 404 and Ethernet switching chip 114. The API library 416 may include API's in one or more of the following categories: (1) Set User Defined Lookup Key, (2) Set Lookup Table, (3) Set Virtual Interface Table, (4) Read/Write registers, and (5) Send/Receive Packet.

The Set User Defined Lookup Key (UDLK) API configures the Ethernet switching chip 114 by setting the UDLK. The UDLK can be fields from an IP packet header as well as certain metadata (e.g., the incoming port of the packet). Meta-data may be joined with non-consecutive byte range may also define a UDLK.

The Set Lookup Table API configures different lookup tables or TCAM tables by setting the table entries to include a value bit, a mask bit, and a corresponding virtual output interface. The value bit representing an intermediate address and the mask bit indicating whether the value bit is designated as "care" or "don't care" in the TCAM table 212.

The Read/Write registers API may be used to read and write registers in the Ethernet switching chip 114. The registers may include various information used by the Ethernet switching chip 114 such as data packet queue length, packet counters, and other registers that are used to configure the Ethernet switching chip, which configure features like enable/disable message processing.

The Set Virtual Interface Table API configures a virtual entry interface which contains destination and source addresses of the TCAM table 212 as well as output port information for the output port table 218.

Lastly, the Send/Receive Packet API configures the Ethernet switching chip 114 to direct data packets through the NIC module 116, such that the API can send packets to an output port, or receive packets with an input port.

CONCLUSION

Although the embodiments have been described in language specific to structural features and/or methodological acts, is the claims are not necessarily limited to the specific features or acts described. Rather, the specific features and acts are disclosed as illustrative forms of implementing the subject matter described in the disclosure.

What is claimed is:

1. A method comprising:
storing a plurality of entries in a ternary content-addressable memory (TCAM) table on an Ethernet switching chip integrated into a control server, one or more entries of the plurality of entries comprising an index and two or more intermediate addresses, the one or more entries including an indication of a port on the Ethernet switching chip;
receiving, from a source server, a data packet at the control server;
extracting a key at the Ethernet switching chip from the data packet, the key comprising a key index and two or more key intermediate addresses;
comparing the key with at least one entry of the plurality of entries stored in the TCAM table;
determining, as a matched entry in the TCAM table, that the key index and at least one key intermediate address of the two or more key intermediate addresses match the at least one entry in the TCAM table;
collecting, by the control server, first congestion information representing a number of data packets waiting to be sent from the Ethernet switching chip and an amount of bandwidth available for sending one or more data packets from the Ethernet switching chip to a destination server;

based at least partly on the matched entry in the TCAM table, sending the data packet to a designated port of the Ethernet switching chip, the designated port being associated with the at least one entry of the TCAM table;

sending, by the control server, second congestion information to the source server, the second congestion information instructing the source server to reduce a rate of transmitting the data packets to the destination server, the second congestion information bypassing the Ethernet switching chip, the Ethernet switching chip integrated into the control server;

processing the data packet in a user space maintained by the control server or in a routing device driver in the control server based at least in part on one or more latency requirements for processing the data packet, the user space including at least one or more application programming interfaces for configuring the TCAM table; and sending the data packet from the designated port to the destination server.

2. The method of claim 1, wherein the key matches the at least one entry in the TCAM table when the key index and one of the two or more key intermediate addresses match the index and one of the two or more intermediate addresses.

3. The method of claim 1, wherein an intermediate address of the one or more entries in the TCAM table comprises a value and a mask bit, the mask bit being selectively set to "care" or "don't care".

4. The method of claim 3, wherein the comparing the key and the at least one entry in the TCAM table includes comparing the index and the two or more intermediate addresses that include the mask bit that is set to "care".

5. The method of claim 3, wherein the comparing the key and the at least one entry in the TCAM table ignores the two or more intermediate addresses that include the mask bit that is set to "don't care".

6. The method of claim 1, wherein the control server provides a plurality of values being stored in the TCAM table.

7. The method of claim 1, wherein the data packet includes an Ethernet packet header received at the Ethernet switching chip.

8. The method of claim 1, wherein determining that the key index and at least one key intermediate address of the two or more key intermediate addresses match the at least one entry in the TCAM table comprises determining that the key index and the at least one key intermediate address match one entry of the plurality of entries in the TCAM table.

9. A system comprising:
one or more processors; and
memory coupled to the one or more processors, the memory including one or more modules that are executable by the one or more processors to perform operations of:
storing a plurality of entries in a ternary content-addressable memory (TCAM) table on an Ethernet switching chip integrated into a control server, one or more entries of the plurality of entries comprising an index and two or more intermediate addresses, the one or more entries including an indication of a port on the Ethernet switching chip;
receiving, from a source server, an incoming data packet at the control server;

extracting a key at the Ethernet switching chip from the incoming data packet, the key comprising a key index and two or more key intermediate addresses;
comparing the key with at least one entry of the plurality of entries stored in the TCAM table;
determining, as a matched entry in the TCAM table, that the key index and at least one key intermediate address of the two or more key intermediate addresses match the at least one entry in the TCAM table;
collecting first congestion information representing a number of data packets waiting to be sent from the Ethernet switching chip and an amount of bandwidth available for sending one or more data packets from the Ethernet switching chip;
based at least partly on the matched entry in the TCAM table, sending the incoming data packet to a designated port of the Ethernet switching chip, the designated port being associated with the matched entry in the TCAM table;
sending, by the control server, second congestion information to the source server, the second congestion information instructing the source server to reduce a rate of transmitting the data packets to a destination server, the second congestion information bypassing the Ethernet switching chip integrated into the control server;
processing the data packet in a user space maintained by the control server or in a routing device driver in the control server based at least in part on one or more latency requirements for processing the data packet, the user space including at least an application for programming the routing device driver; and
sending the incoming data packet from the designated port to the destination server.

10. The system of claim 9, wherein the key matches the at least one entry in the TCAM table when the key index and one of the two or more key intermediate addresses match the index and one of the two or more intermediate addresses.

11. The system of claim 9, wherein an intermediate address of the one or more entries in the TCAM table comprises a value and a mask bit, the mask bit being selectively set to "care" or "don't care".

12. The system of claim 11, wherein the comparing the key and the at least one entry in the TCAM table includes comparing the index and the two or more intermediate addresses that include the mask bit that is set to "care".

13. The system of claim 11, wherein the comparing the key and the at least one entry in the TCAM table ignores the two or more intermediate addresses that include the mask bit that is set to "don't care".

14. The system of claim 9, wherein the control server provides a plurality of values being stored in the TCAM table.

15. The system of claim 9, wherein the incoming data packet includes an Ethernet packet header received at the Ethernet switching chip.

16. The system of claim 9, wherein determining that the key index and at least one key intermediate address match the at least one entry in the TCAM table comprises determining that the key index and at least one key intermediate address match one entry of the plurality of entries in the TCAM table.

17. A system comprising:
an Ethernet switching chip integrated into a routing device, the Ethernet switching chip configured to:

store a plurality of entries in a ternary content-addressable memory (TCAM) table, one or more entries of the plurality of entries comprising an index and two or more intermediate addresses, the one or more entries including an indication of a port on the Ethernet switching chip;
extract a key from a data packet received from a source server, the key including an index value and two or more intermediate address values;
compare at least one entry of the plurality of entries with the key;
determine, as a matched entry, that the at least one entry matches the key;
based at least partly on the matched entry, send the data packet to a designated port of the Ethernet switching chip, the designated port being associated with the matched entry;
transmit the data packet to a user space for processing or to a routing device driver for processing based at least in part on one or more latency requirements for processing the data packet; and
send the data packet from the designated port to the destination server; and
a control server configured to:
collect first congestion information representing a number of data packets waiting to be sent from the Ethernet switching chip and an amount of bandwidth available for sending one or more data packets from the Ethernet switching chip to a destination server; and
send second congestion information to the source server, the second congestion information instructing the source server to reduce a rate of transmitting the data packets to the destination server, the second congestion information bypassing the Ethernet switching chip;
wherein the routing device, the user space, and the routing device driver are installed in the control server, and
wherein the routing device is coupled with the control server via a peripheral component interconnect express (PCI-E) switching chip.

18. The system of claim 17 further comprising:
a network interface controller (NIC) module coupled to the PCI-E, the NIC module comprising one or more Network Interface chips; and
an Ethernet physical transceiver chip (PHY) in electrical communication with an input of the Ethernet switching chip, the PHY receiving data packets from the source server and providing the data packets to the Ethernet switching chip.

19. The system of claim 17, wherein the control server configures the routing device to:
store values in the TCAM table; and
in response to determining that the at least one entry of the plurality of entries is compared against the key, set a mask over a portion of the two or more intermediate address values to mask the portion of the two or more intermediate address values during a comparison between the portion of the two or more intermediate address values and the key.

20. The system of claim 17, wherein the Ethernet switching chip is further configured to associate the designated port of the Ethernet switching chip with the one or more entries in the TCAM table based at least in part on an output table.

* * * * *